United States Patent
Nieuwenhuizen

(10) Patent No.: US 7,980,814 B2
(45) Date of Patent: Jul. 19, 2011

(54) WIND TURBINE TOWER AND A CONTROL SYSTEM AND METHOD FOR ALTERING THE EIGENFREQUENCY OF A WIND TURBINE TOWER

(75) Inventor: John Johannes Mathias Hubertus Nieuwenhuizen, Horsens (DK)

(73) Assignee: Vestas Wind Systems A/S (DK)

( * ) Notice: Subject to any disclaimer, the term of this patent is extended or adjusted under 35 U.S.C. 154(b) by 173 days.

(21) Appl. No.: 12/346,590

(22) Filed: Dec. 30, 2008

(65) Prior Publication Data
US 2009/0142178 A1    Jun. 4, 2009

Related U.S. Application Data

(63) Continuation of application No. PCT/DK2007/000316, filed on Jun. 28, 2007.

(30) Foreign Application Priority Data

Jun. 30, 2006   (DK) .................................. 2006 00895

(51) Int. Cl.
*F03D 11/04* (2006.01)
(52) U.S. Cl. .......... 415/119; 415/118; 415/1; 416/244 R
(58) Field of Classification Search ................ 415/119, 415/1, 118; 416/1, 244 R, 500; 290/44, 290/55
See application file for complete search history.

(56) References Cited

U.S. PATENT DOCUMENTS

| | | | |
|---|---|---|---|
| 4,692,094 A | 9/1987 | Kulinyak | |
| 5,531,567 A | 7/1996 | Hulls | |
| 6,672,837 B1 | 1/2004 | Veldkamp | |
| 7,309,930 B2 * | 12/2007 | Suryanarayanan et al. | 290/55 |
| 2007/0114799 A1 * | 5/2007 | Riesberg et al. | 290/55 |
| 2008/0118342 A1 * | 5/2008 | Seidel et al. | 415/1 |
| 2008/0260514 A1 * | 10/2008 | Nielsen et al. | 415/4.3 |

FOREIGN PATENT DOCUMENTS

| DE | 10309825 A1 | 9/2004 |
|---|---|---|
| EP | 1262614 A2 | 12/2002 |

OTHER PUBLICATIONS

International Search Report and Written Opinion of the International Searching Authority, Sep. 26, 2007 (13 pages).
International Preliminary Report on Patentability, Oct. 21, 2008 (6 pages).

* cited by examiner

*Primary Examiner* — Ninh H Nguyen
(74) *Attorney, Agent, or Firm* — St. Onge Steward Johnston & Reens LLC

(57) ABSTRACT

A wind turbine comprising a wind turbine rotor with at least one wind turbine blade, a wind turbine tower, such as a standard tubular steel tower, positioned on a foundation and connected to the wind turbine rotor through a wind turbine nacelle, and a control for establishing oscillation control values of the wind turbine. The wind turbine being capable of altering the load for optimizing the tower eigenfrequency in response to acquired values from the controls. The invention also relates to a control system and method for altering the eigenfrequency of a tower of a wind turbine.

17 Claims, 6 Drawing Sheets

WIND TURBINE TOWER AND A CONTROL SYSTEM AND METHOD FOR ALTERING THE EIGENFREQUENCY OF A WIND TURBINE TOWER

CROSS-REFERENCE TO RELATED APPLICATIONS

The present application is a continuation of pending International patent application PCT/DK 2007/000316 filed on 28 Jun. 2007 which designates the United States and claims priority from Danish patent application No. PA 2006 00895 filed on 30 Jun. 2006, the content of which is incorporated herein by reference.

FIELD OF THE INVENTION

The invention relates to a wind turbine, a control system for altering the eigenfrequency of a tower of a wind turbine and a method for altering the eigenfrequency of a tower of a wind turbine.

BACKGROUND OF THE INVENTION

A wind turbine known in the art comprises a tapered wind turbine tower and a wind turbine nacelle positioned on top of the tower. A wind turbine rotor with a number of wind turbine blades is connected to the nacelle through a low speed shaft, which extends out of the nacelle front as illustrated on FIG. 1.

The natural critical frequency (also known as the eigenfrequency or resonance frequency) of a wind turbine tower is a known issue in the wind turbine industry.

E.g. a 50 meter tall wind turbine tower will have a tendency to swing back and forth, say, every three seconds. The frequency with which the tower oscillates back and forth is also known as the eigenfrequency of the tower. The eigenfrequency among other things depends on the height of the tower, the thickness of its walls, the type of steel, and the weight of the nacelle and rotor. Each time a rotor blade passes the wind shade of the tower, the rotor will push slightly less against the tower. If the rotor turns with a rotational speed such that a rotor blade passes the tower each time the tower is in one of its extreme positions, then the rotor blade may either dampen or amplify the oscillations of the tower.

The rotor blades themselves are also flexible, and may have a tendency to vibrate at a frequency of e.g. 1 to 2 Hz, which under certain circumstances may further amplify or dampen the tower oscillations. In worst case several factors acting simultaneously could make the tower oscillate to a degree that the tower or other parts of the wind turbine is damaged, that the life of the tower or other parts are severely reduced or at least reduce the efficiency of the wind turbine.

One way of dealing with this problem is to take different measures during the design phase of the wind turbine e.g. by making the tower stiffer, by reducing the weight of the nacelle and rotor or other. But these measures often collide with other desired qualities of the wind turbine such as low production cost, high efficiency and other.

Other way of dealing with this problem has therefore been developed and one of these is disclosed in German patent application No DE-A 10309825. This application disclose a way of damping of tower movements by three stay wires connected to individual foundations in the ground surrounding the wind turbine, each fitted with a self-controlling hydraulic damper. The dampers ensure that the movement of the light and flexible tower does not become so large and uncontrollable, that they endanger the wind turbine. But for this system to work the stay wires has to be relatively long and fixated relatively far from the tower for the dampers to see sufficient motion to function properly. This is of course disadvantageous in that the wind turbine hereby will occupy more space and in that esthetically, this design is much undesired. Furthermore, the entire system and especially the separate foundations for the stay wires will increase the overall cost of the wind turbine considerably making this design less cost-efficient, particularly with off-shore wind turbines.

An object of the invention is therefore to provide for a wind turbine without the mentioned disadvantages.

Especially it is an object of the invention to provide for an advantageous and cost-efficient technique for reducing the risk of tower oscillations causing damage to the wind turbine or reducing its efficiency.

SUMMARY OF THE INVENTION

The invention provides for a wind turbine comprising a wind turbine rotor with at least one wind turbine blade, a wind turbine tower, such as a standard tubular steel tower, positioned on a foundation and connected to the wind turbine rotor through a wind turbine nacelle, and control means for establishing oscillation control values of the wind turbine. The wind turbine is characterized in that the tower comprises load altering means for optimizing the tower eigenfrequency in response to the values from the control means.

Almost all mechanical systems have one or more resonance frequencies, where the system absorbs more energy from oscillations when the frequency of the systems oscillations matches or substantially matches the systems resonance frequency of vibration. By providing the tower with load altering means it is possible to adjust the load on the tower or a part of the tower, hereby altering the towers eigenfrequency, making it different from e.g. the frequency of the vibrations induced by the rotor.

Most modern wind turbines already comprise control means for establishing oscillation control values of the wind turbine. By providing the wind turbine with load altering means and basing the control of these load altering means on the values, it is possible to alter the towers natural critical frequencies by changing its stiffness and hereby dampen tower oscillations. This is advantageous in that it provides for a simple and cost-efficient way of dampening tower oscillations and in that by optimizing the tower eigenfrequency it is possible to gain a more stable structure of the wind turbine tower, whereby e.g. material savings may be obtained.

A system according to the invention furthermore has the advantage of being able to react before critical oscillations occur, in that the system is based on oscillation control values, which can be used to predict the oscillation status of the tower.

In an aspect of the invention, said load altering means comprise means for adjusting the load on said tower or a part of said tower.

Adjusting the load on the tower or a part of the tower is advantageous in that it provides for a simple and cost-efficient way of altering the towers natural critical frequencies and hereby preventing or at least reducing tower oscillations.

In an aspect of the invention, said load altering means comprise connection means vertically connecting a tower position with at least one lower tower position or with the foundation.

By connecting different tower portions to each other or to the foundation by means of the connection means, it is possible to control the stiffness of the tower or specific parts of the tower. This may increase the possibility of obtaining material savings.

In an aspect of the invention, said connection means include steel wire or rods.

By using steel wire or rods as the said connection means, an economical solution for optimizing the tower eigenfrequency is obtained.

In an aspect of the invention, said connection means include damper means.

By providing the connection means with damper means it is possible to reduce the peak stresses (e.g. from sudden jerks in the means) in the connection means by distributing the loads over time. This is advantageous in that the connection means and their connection to the tower or foundation can be made more simple and inexpensive. Furthermore, the damper means would also reduce noise emission from the load altering means.

In an aspect of the invention, said load altering means includes at least one actuating means acting directly or indirectly on said connection means.

By actuating directly or indirectly on said connection means, an easy control of the tension of the connection means is obtained.

In an aspect of the invention, at least one actuating means are hydraulic or electric actuators changing the tension of said connection means in response to said control values from the control means.

By altering the tension of the connection means it is possible to alter the stiffness of the wind turbine tower, whereby the critical natural frequency or frequencies of the tower also may be altered. By altering the stiffness of the tower it is possible to avoid or partly avoid resonances in the tower structure of the wind turbine. It is further a possibility to use the before mentioned optimization of the stiffness of the tower as a temporarily solution during wind turbine erection.

In an aspect of the invention, said control means include sensors such as accelerometers, strain-gauges, anemometers, thermometers or other for measuring oscillation values of the wind turbine.

By making the control means include sensors e.g. detecting the wind speed or the acceleration of the tower oscillations it is possible to establish more accurate oscillation control values which enables that the load altering means can be controlled more accurately.

In an aspect of the invention, said load altering means are positioned inside said tower.

By placing the load altering means inside the tower, an easier access to the means can be obtained. Furthermore, the load altering means will be placed in a more controlled environment and protected for rain, snow, sea fog and other hereby making it possible to avoid or at least severely reduce corrosion and other wear of the load altering means.

In an aspect of the invention, said load altering means are at least three independent load altering means evenly spaced on said tower e.g. two sets of substantially vertical connection means positioned at opposite inner surface sides of said tower.

By using at least three evenly spaced independent load altering means it is possible to obtain greater and more uniform control over the tower eigenfrequency no matter the wind direction and/or the direction of the oscillations.

In an aspect of the invention, said control means are configured for activating said load altering means if said oscillation control values are outside one or more predefined limits.

If e.g. the tower does not oscillate or if there is not any wind or if the amplitude or acceleration of the oscillations or the wind speed is beneath a certain level or other it could be advantageous to not activate the load altering means, in that it hereby is possible to reduce the wear on the means and hereby prolong their life.

In an aspect of the invention, said control means comprise means for adjusting said load altering means dynamically and/or proportionally in relation to said oscillation control values.

By making the control means adjust the load altering means dynamically and/or proportionally to the values it would e.g. be possible to inflict proportional countermotions if oscillations of the tower occurred or it would be possible to dynamically stiffen a specific part of the tower in relation to the direction and/or the speed of the wind. This is advantageous in that it hereby is possible to dampen tower oscillations in a more efficient way providing as little extra stress to the tower structure as possible.

The invention further provides for a control system for altering the eigenfrequency of a tower of a wind turbine according to any of the preceding claims. The control system comprises means for establishing oscillation control values of the wind turbine an is characterized in that the system comprise load altering means for adjusting the load on the tower or on a part of the tower in response to the oscillation control values.

Altering the eigenfrequency of the tower by adjusting the load on the tower or on a part of the tower is advantageous in that in that it is a simple and cost-efficient way of controlling oscillations in the tower and basing this control on oscillation control values provides for a more accurate control.

The invention also provides for a method for altering the eigenfrequency of a tower of a wind turbine. The method comprises the steps of establishing oscillation control values of the wind turbine by means of control means, and a optimizing the tower eigenfrequency by means of load altering means of the tower in response to the oscillation control values.

Hereby is achieved an advantageous method for reducing the risk of tower oscillations causing damage to the wind turbine or reducing its efficiency.

In an aspect of the invention, said oscillation control values are established on the basis of oscillation of said tower.

Tower oscillations are dampened on the basis of the oscillation control values by adjusting the tower eigenfrequency and it is therefore advantageous that the oscillation control values are established directly on basis of oscillation of the tower.

In an aspect of the invention, said load altering means optimizes the tower eigenfrequency by adjusting the load on said tower or a part of said tower.

In an aspect of the invention, said load altering means comprise connection means vertically connecting a tower position with at least one lower tower position or with the foundation.

In an aspect of the invention, said load is adjusted by adjusting the tension of said connection means.

In an aspect of the invention, said load altering means are activated if said oscillation control values are outside one or more predefined limits.

BRIEF DESCRIPTION OF THE DRAWINGS

The invention will be described in the following with reference to the figures in which.

DETAILED DESCRIPTION OF THE INVENTION

Figure 1:
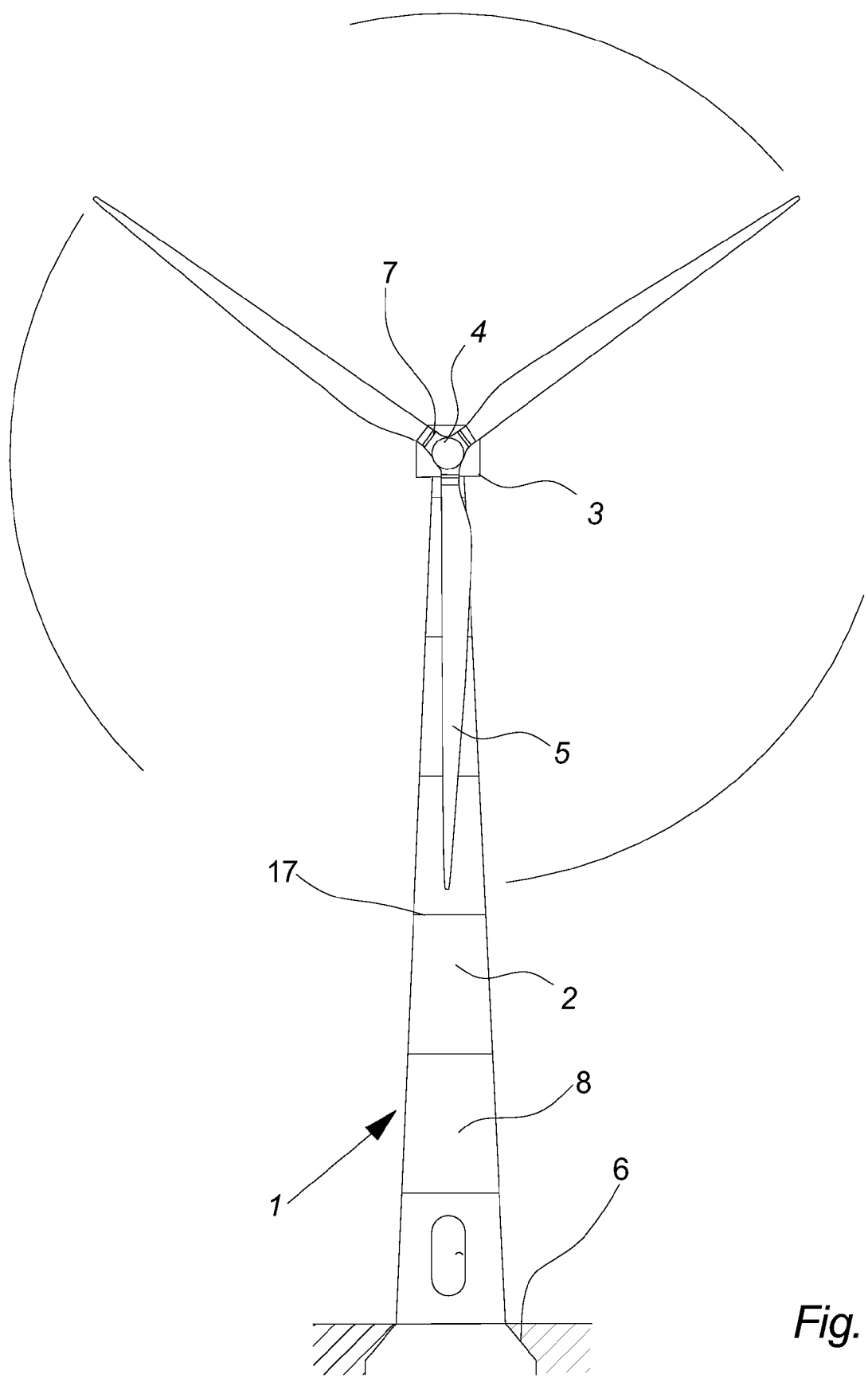
FIG. 1 illustrates a large modern wind turbine, as seen from the front.

FIG. 1 illustrates a wind turbine 1 known in the art, comprising a tapered tower 2, which is subdivided into a number of tower sections 8 mounted on a foundation 6. A wind turbine nacelle 3 is positioned on top of the tower 2.

In this embodiment of the invention the wind turbine rotor 4 comprises three wind turbine blades 5, which are connected to the hub of the rotor 4 through pitch mechanisms. Each pitch mechanism includes a blade bearing 7 which allows the blade 5 to pitch in relation to the wind. The hub is connected to the nacelle 3 by connecting it directly to a wind turbine gear at the nacelle front or via a shaft directly connected to a generator or indirectly through a gear mechanism and low speed/high speed shafts wherein the connections may comprise one or more shaft bearings such as rotor and generator bearings.

Figure 2:
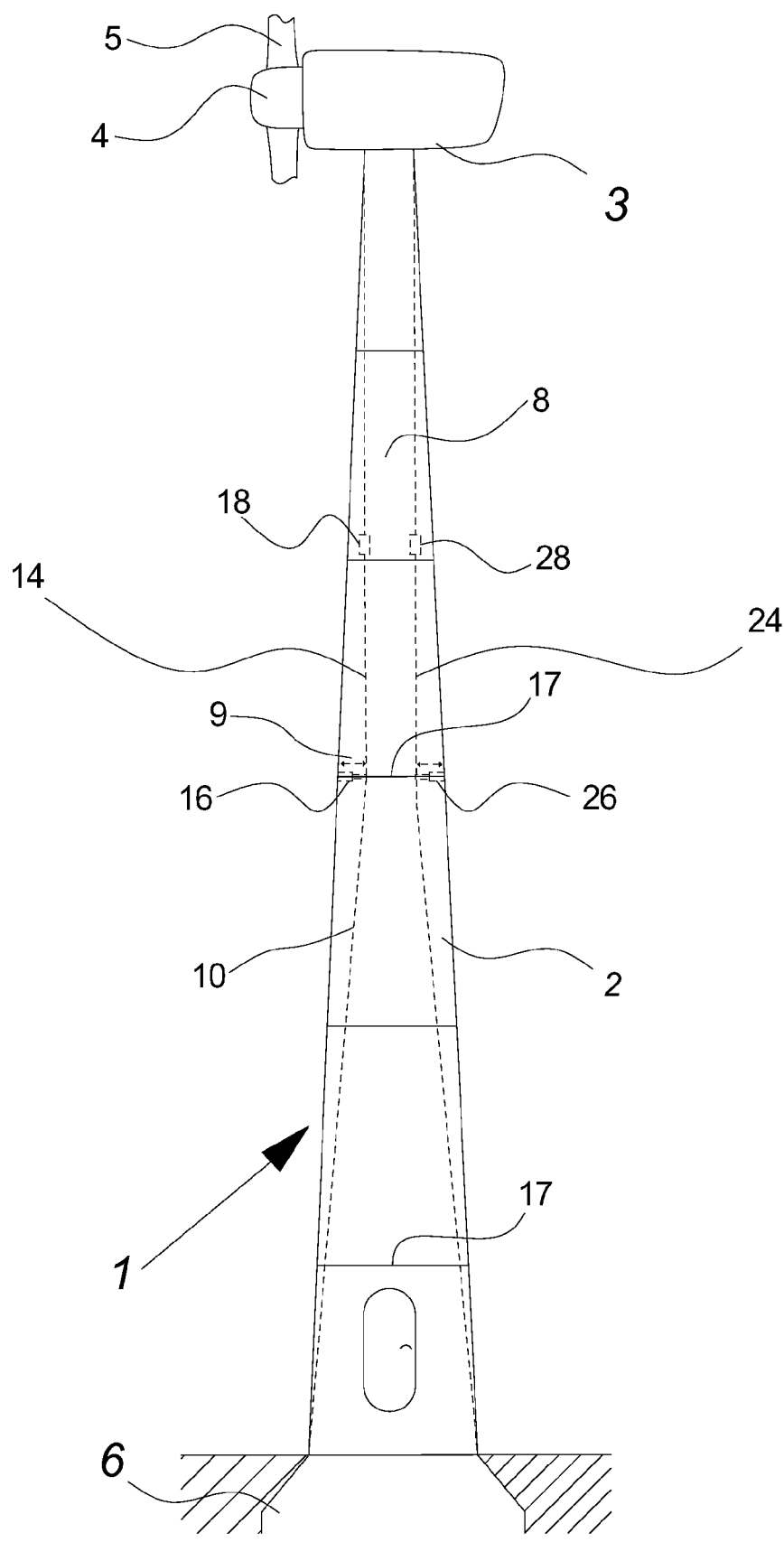
FIG. 2 illustrates an embodiment of wind turbine comprising load altering means, as seen from the side.

FIG. 2 illustrates an embodiment of wind turbine comprising load altering means, as seen from the side.

In this embodiment of the invention the tower 2 comprise load altering means 9 in the form of connection means 10 formed as two wires, bars or the like 14, 24 fixated at the top of the wind turbine tower 2. The wires 14, 24 are in this embodiment fixated at the tower flanges at the top and at the bottom flanges of the tower. The load altering means 9 further comprise actuators 16, 26 placed at one of the tower sections joints 17.

In another embodiment of the invention, the connection means 10 may be fixated anywhere at the tower wall, giving the benefit of optimizing the stiffness at any area or point of the wind turbine tower structure.

In a further embodiment of the invention the actuator(s) 16, 26 are placed at the end of the wire, bars or the like 14, 24 providing the possibility of controlling and changing the tension of the wires, bars or the like 14, 24 by pulling the end of the connection means 10.

The wires or bars 14, 24 may be connected to damping means 18, 28, facilitating the possibility of damping any sudden jerks in the wire, giving the benefit of protecting the wire or bar 14, 24 from breaking or overload. The dampers 18, 28 may be hydraulic dampers, pneumatic dampers, spring dampers or the like. The wires may be actuated by one or more actuators 16, 26, which are controlling the tension of the wires or bars 14, 24. The actuators may be fixated on the tower wall by magnets, bolts, fittings or the like, and could be placed at different points of the tower structure.

By controlling the tension of the wire or bar 14, 24, it is possible to control and alter the stiffness and/or resonance frequency of the tower 2. The actuators 16, 26 may further be controlled depending on different variables, e.g. the amplitude or acceleration of vibration of the tower 2, the wind speed and/or direction, the temperature, the rotor speed or the rotational speed of other shafts or the like. The wires 14, 24 and actuators 16, 26 may preferably be placed symmetrically and/or equally spaced in the tower structure.

In this embodiment of the invention the wind turbine 1 comprise control means for establishing oscillation control values. The tension of the connection means 10 of the load altering means 9 is then adjusted on the basis of these values.

E.g. if the wind speed was above a certain level or if the control means detects oscillations over a certain amplitude the control means could make both actuators 16, 26 extend, only one actuator 16, 26 extend depending of the direction of the oscillations or the wind or the actuators 16, 26 could extend dynamically and/or proportionally to the oscillation control values.

Figure 3:
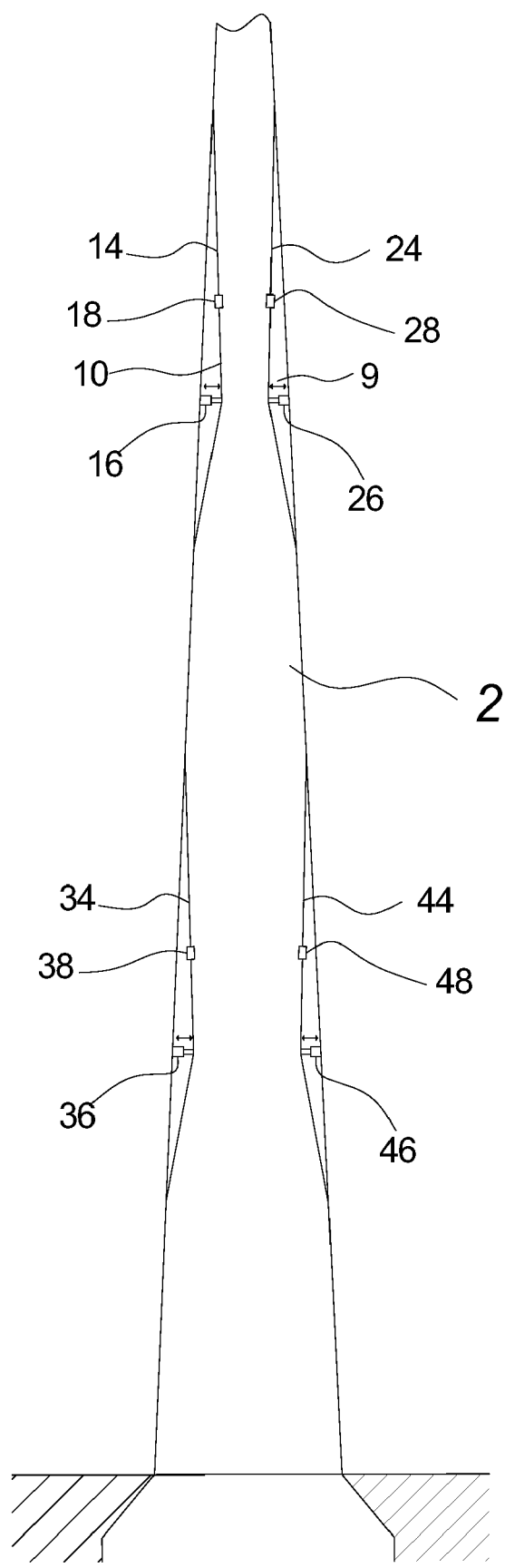
FIG. 3 illustrates another embodiment of wind turbine comprising load altering means, as seen from the front.

FIG. 3 illustrates another embodiment of wind turbine 1 comprising load altering means 9, as seen from the front.

In this figure an alternative placement of the load altering means 9 is disclosed, comprising wires, bars or the like 14, 24, at least one actuator 16, 26, actuating each wire 14, 24 and at least one damping arrangement 18, 28, protecting the wires 14, 24 for sudden jerks. By placing the load altering means 9 at a given area of the tower structure, it is possible to optimize the stiffness of the tower 2 at a substantially specific point or area in the tower structure. It is noted that a plurality of load altering means 9 may be placed at a plurality of different areas of the tower 2.

In one embodiment of the invention, the actuators 16, 26, and/or the ends of the wires, bars or the like, are placed at and/or connected to the tower sections joints (not shown in FIG. 3).

Figure 4:
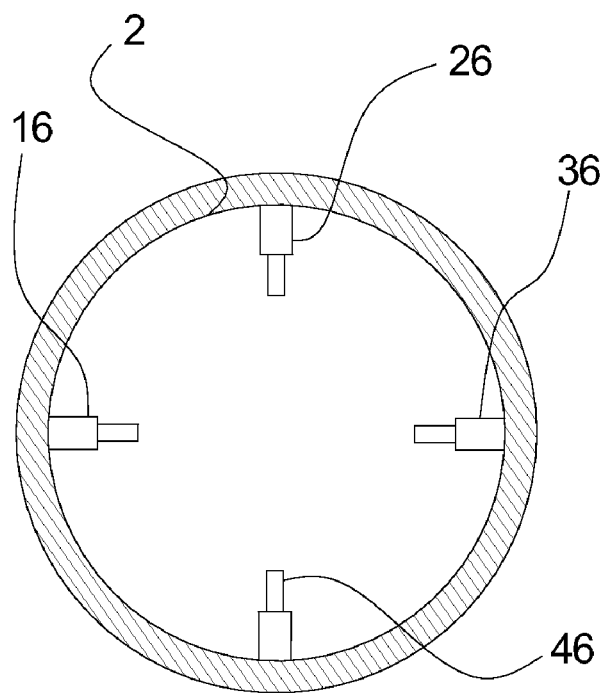
FIG. 4 illustrates a cross section of a wind turbine tower, as seen from the top.

FIG. 4 illustrates a cross section of a wind turbine tower 2, as seen from the top.

In this embodiment of the invention the tower 2 comprises four symmetrically positioned and evenly spaced actuators 16, 26, 36, 46 in the wind turbine tower 2. In another embodiment of the invention the tower 2 could comprise another number of actuators 16, 26, 36, 46 such as one, two or three, they could be placed at different heights in the tower 2 and they could be placed asymmetrically e.g. if the wind at a specific wind turbine site always came from only a few directions or other.

Figure 5:
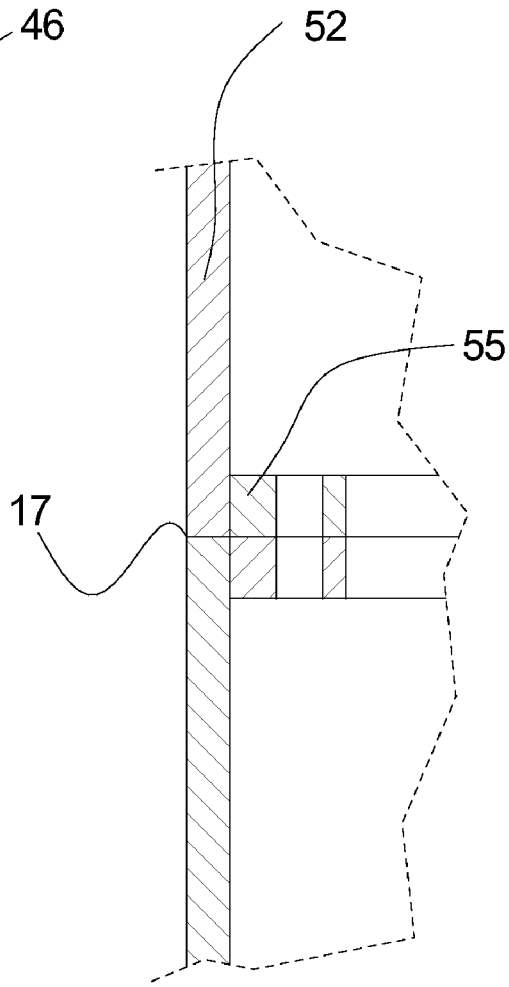
FIG. 5 illustrates a part of cross section of a wind turbine tower comprising a tower section joint, as seen from the side.

FIG. 5 illustrates a part of cross section of a wind turbine tower 2 comprising a tower section joint 17, as seen from the side.

As illustrated in FIG. 1, a traditional wind turbine tower 2 comprises a number of tapered round tower sections 6 mounted on top of each other. The tower sections 6 are bolted together through the internally placed horizontal flanges 55, which are welded to the top and bottom of each section 6.

Because of the flanges 55, the tower structure is particular strong at the tower sections joints 17. This makes the joints 17 an advantageous area for placing the actuators (not shown in FIG. 5).

Figure 6:
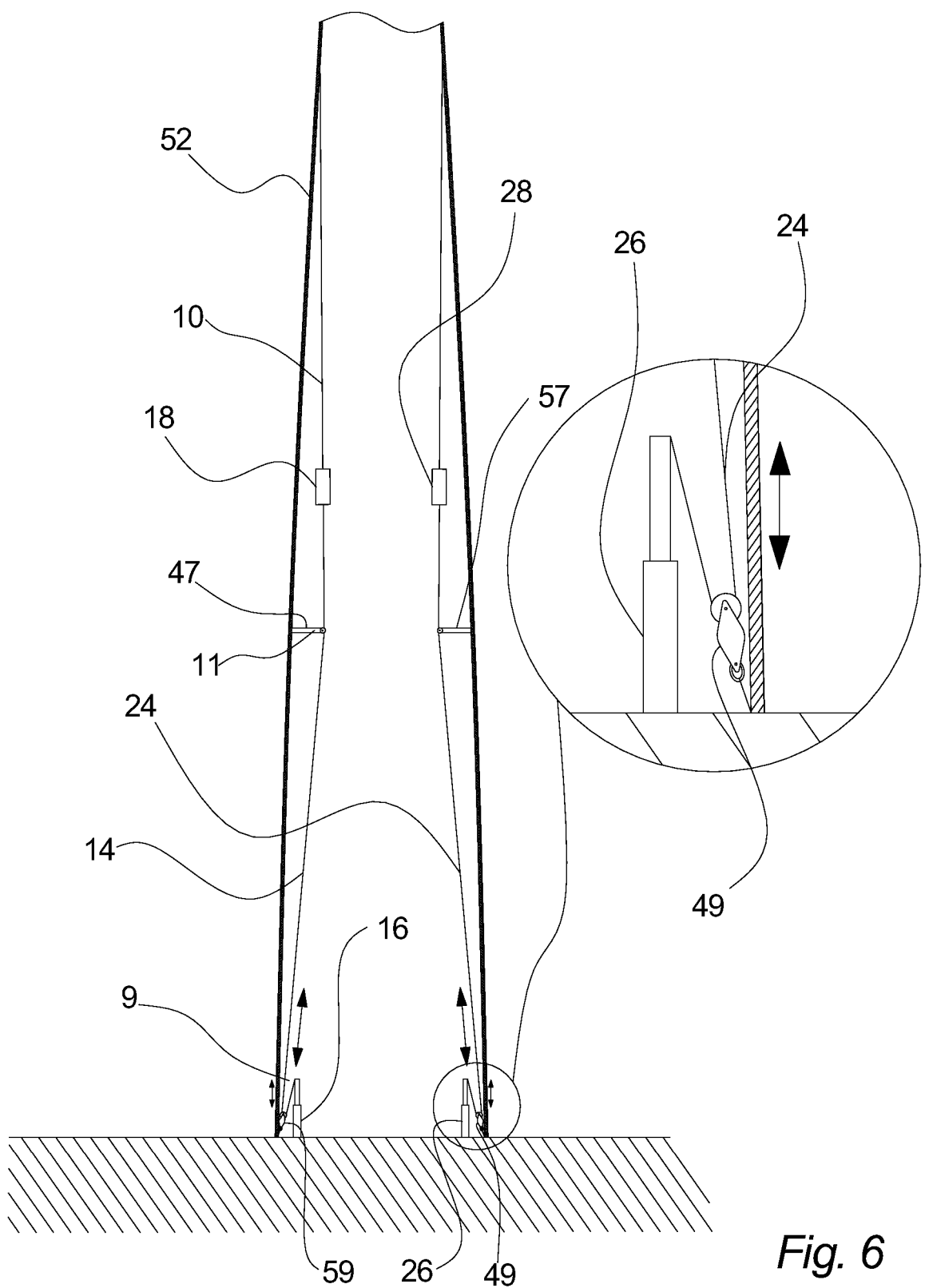
FIG. 6 illustrates a further embodiment of wind turbine comprising load altering means, as seen from the side.

FIG. 6 illustrates a further embodiment of wind turbine 1 comprising load altering means 9, as seen from the side.

In this embodiment of the invention, the tension of the wires 14, 24 is controlled by one or more actuators 16, 26, placed at the bottom of the tower 2. The connection means 10 may be connected to the bottom flange of the tower, the foundation or the like by at least one tackle 49, 59 or the like. The wires, bars or the like 14, 24 may be held in a distance from the tower walls by means of guiding means 11, which in this case are provided in the form of bars 47, 57 extending from the tower walls. The bars 47, 57 may at the end which is in contact with the connection means 10 further comprise one or more tackles, wheels or the like to form the guiding means 11.

The connection means 10 are in this embodiment further connected to one or more damping means 18, 28. The damping means could be placed anywhere on the wires 14, 24, e.g. at one of the ends of the wire or bar 14, 24.

In a further embodiment of the invention the load altering means 10 may be placed on the outside of the tower.

Figure 7:
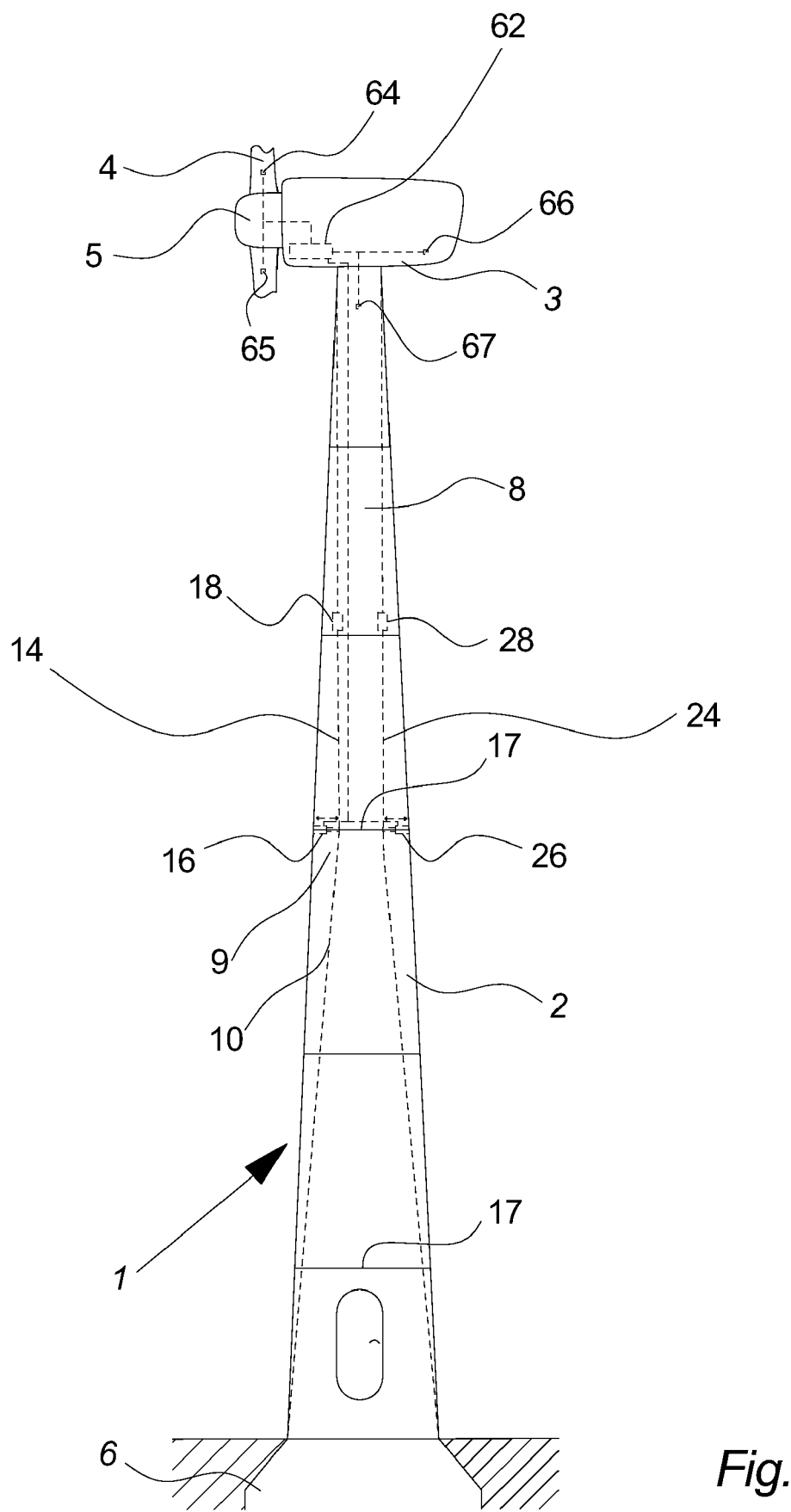
FIG. 7 illustrates an even further embodiment of wind turbine comprising load altering means, as seen from the side.

FIG. 7 illustrates an even further embodiment of wind turbine 1 comprising load altering means 9, as seen from the side.

In this embodiment of the invention the connection means 10 in the form of two wires, bars or the like 14, 24 are fixated at the top of the wind turbine tower 2. The wires 14, 24 are in this embodiment fixated at the tower flanges at the top and at the bottom of the tower. The actuators 16, 26 are placed at one of the tower sections joints 17.

In this embodiment the actuators 16, 26 are controlled by a control system 62. The control system 62 may comprise one or more sensors 64, 65, 66, 67, e.g. accelerometers, straingauges, radars, thermometers, anemometers or other which measures e.g. vibrations in the tower, wind speed or other and controls the actuators 16, 26 on the basis of the measurements from the sensor(s) 64, 65, 66, 67. The control system 62 may further comprise a plurality of different variables, e.g. the wind speed, measured by an anemometer, and may control the actuators 16, 26 based on measurements and/or algorithms. The control system 62 may control the actuators 16, 26 individually as well as in groups. It is noted that a plurality of sensors 64, 65, 66, 67 may be placed at several point of the wind turbine 1, giving the possibility of control the actuators 16, 26 based on precise and reliable measurements form the entire wind turbine 1.

In an embodiment of the invention the control system 62 controls a plurality of load altering means 10 based of measurements from said sensor(s) 64, 65, 66, 67.

In another embodiment of the invention, the connection means 10 are only connected directly or indirectly at one point of the tower structure, e.g. the tower flange 55 at the top of the tower, and does not touch the tower 2 neither directly or indirectly at any point, between the connection points of the wires, bars 14, 24 or the like. The other end of the wires, bars or the like may be directly or indirectly connected to the foundation 6. The actuators 16, 26, e.g. pulling means, are placed somewhere between the end points or at the end(s) of the wires or bars 14,24.

In another embodiment of the invention, the ends of the connection means 10 are both connected to the tower structure and the connection means 10 do not touch the tower wall at any point between the connection points of connection means 10. At least one of the ends of the wires, bars 14, 24 or the like are connected to a fitting, which prevents the wire, bar 14, 24 from touching the tower wall at any point between the two connection points. The actuators 16, 26 may be placed at one or both ends of the wires, bars 14, 24 or the like.

In another embodiment of the invention the wires, bars 14, 24 or the like may be endless.

The invention has been exemplified above with reference to specific examples of wind turbines 1, load altering means 9, connection means 10 and other. However, it should be understood that the invention is not limited to the particular examples described above but may be designed and altered in a multitude of varieties within the scope of the invention as specified in the claims.

What is claimed is:

1. A wind turbine comprising
   a wind turbine rotor with at least one wind turbine blade,
   a wind turbine tower, such as a standard tubular steel tower, positioned on a foundation and connected to said wind turbine rotor through a wind turbine nacelle, and
   a controller for establishing oscillation control values of the wind turbine,
   wherein said tower comprises load altering means for optimizing the tower eigenfrequency in response to said values from said controller,
   wherein said load altering means comprise a connector vertically connecting a tower position with at least one lower tower position and/or the foundation; and
   wherein said connector, in its course extending from said one connecting tower position to said at least one lower connecting tower position, defines a change in direction.

2. The wind turbine according to claim 1, wherein said load altering means comprise means for adjusting the load on at least a part of said tower.

3. The wind turbine according to claim 2, wherein said connector includes a damper.

4. The wind turbine according to claim 2, wherein said load altering means include at least one actuator acting directly or indirectly on said connector.

5. The wind turbine according to claim 4, wherein the at least one actuator comprises at least one hydraulic or electric actuator changing the tension of said connector in response to said control values from the controller.

6. The wind turbine according to claim 1, wherein said load altering means are positioned inside said tower.

7. The wind turbine according to claim 1, wherein said load altering means are at least three independent load altering means evenly spaced on said tower e.g. two sets of substantially vertical connectors positioned at opposite inner surface sides of said tower.

8. The wind turbine according to claim 1, wherein said controller comprises means for adjusting said load altering means dynamically and/or proportionally in relation to said oscillation control values.

9. A control system for altering the eigenfrequency of a tower of wind turbine according to claim 1, said system comprising
   means for establishing oscillation control values of the wind turbine,
   wherein said system comprises load altering means for adjusting the load on said tower or on a part of said tower in response to said oscillation control values, and
   wherein said load altering means comprise a connector for vertically connecting a tower position with at least one lower tower position and/or a foundation.

10. A method for altering the eigenfrequency of a tower of a wind turbine said method comprising the steps of
    establishing oscillation control values of said wind turbine via a controller, and
    optimizing the tower eigenfrequency via load altering means of said tower in response to said oscillation control values,
    wherein said load altering means comprise a connector vertically connecting a tower position with at least one lower tower position and/or a foundation; and
    wherein said connector, in its course extending from said one connecting tower position to said at least one lower connecting tower position, defines a change in direction.

11. The method according to claim 10, wherein said oscillation control values are established on the basis of oscillation of said tower.

12. The method according to claim 10, wherein said load altering means optimize the tower eigenfrequency by adjusting the load on at least a part of said tower.

13. The method according to claim 12, wherein said load is adjusted by adjusting the tension of said connector.

14. The method according to claim 13, wherein said load altering means are activated if said oscillation control values are outside one or more predefined limits.

15. The method according to claim 13, wherein said load altering means alter said load by moving at least part of said connector in a horizontal direction.

16. A wind turbine comprising
a wind turbine rotor with at least one wind turbine blade,
a wind turbine tower, such as a standard tubular steel tower, positioned on a foundation and connected to said wind turbine rotor through a wind turbine nacelle, and
a controller for establishing oscillation control values of the wind turbine,
wherein said tower comprises load altering means for optimizing the tower eigenfrequency in response to said values from said controller,
wherein said load altering means comprise a connector vertically connecting a tower position with at least one lower tower position and/or the foundation, and
wherein said load altering means are configured for altering said load by moving at least part of said connector in a horizontal direction.

17. A method for altering the eigenfrequency of a tower of a wind turbine said method comprising the steps of
establishing oscillation control values of said wind turbine via a controller, and
optimizing the tower eigenfrequency via load altering means of said tower in response to said oscillation control values,
wherein said load altering means comprise a connector vertically connecting a tower position with at least one lower tower position and/or a foundation, and
wherein said load altering means are configured for altering said load by moving at least part of said connector in a horizontal direction.

* * * * *

UNITED STATES PATENT AND TRADEMARK OFFICE
CERTIFICATE OF CORRECTION

PATENT NO. : 7,980,814 B2
APPLICATION NO. : 12/346590
DATED : July 19, 2011
INVENTOR(S) : John J. Nieuwenhuizen It is certified that error appears in the above-identified patent and that said Letters Patent is hereby corrected as shown below:

In the Specification:

At column 1, line 51, "are severely", should read -- is severely --.

At column 1, line approx. 59, "Other way of dealing with this problem has", should read -- Other ways of dealing with this problem have --.

At column 1, line 61, "application disclose", should read -- application discloses --.

At column 1, line 67, "that they endanger", should read -- that it endanger --.

At column 2, line 1, "wires has", should read -- wires have --.

At column 3, line 23, "are hydraulic", should read -- is hydraulic --.

At column 4, line 18, "an is", should read -- and is --.

At column 4, lines 18-19, "system comprise", should read -- system comprises --.

At column 4, lines 23-24, "in that in that it is", should read -- in that it is --.

At column 4, line 32, "a optimizing the", should read -- optimizing the --.

At column 5, line 27, "tower 2 comprise", should read -- tower 2 comprises --.

At column 5, lines 34-35, "tower sections joints", should read -- tower section joints --.

At column 5, lines 64-65, "wind turbine 1 comprise", should read -- wind turbine 1 comprises --.

Signed and Sealed this
Third Day of April, 2012

David J. Kappos
*Director of the United States Patent and Trademark Office*

CERTIFICATE OF CORRECTION (continued)
U.S. Pat. No. 7,980,814 B2

At column 6, line 4, "depending of the", should read -- depending on the --.

At column 6, lines 44-45, "is particular strong", should read -- is particularly strong --.

At column 6, line 45, "tower sections joints", should read -- tower section joints --.

At column 7, line 9, "tower sections joints", should read -- tower section joints --.

At column 7, line 22, "several point of", should read -- several points of--.

At column 7, line 23, "control the", should read -- control of the --.

At column 7, line 27, "based of measurements", should read -- based on measurements --.

At column 7, line 32, "tower 2 neither", should read -- tower 2 either --.

In the Claims:

At column 8, claim number 10, line 42, "turbine said", should read -- turbine, said --.

At column 10, claim number 17, line 2, "turbine said", should read -- turbine, said --.